US012413020B2

(12) United States Patent
Hsu et al.

(10) Patent No.: US 12,413,020 B2
(45) Date of Patent: Sep. 9, 2025

(54) ELECTRICAL CONNECTOR ASSEMBLY WITH IMPROVED TERMINALS

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Kuo-Chun Hsu, New Taipei (TW); Jian-Kuang Zhu, Kunshan (CN); Yin-Chao Xu, Kunshan (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 272 days.

(21) Appl. No.: 18/116,504

(22) Filed: Mar. 2, 2023

(65) Prior Publication Data

US 2023/0283018 A1 Sep. 7, 2023

(30) Foreign Application Priority Data

Mar. 4, 2022 (CN) ......................... 202210208961.6

(51) Int. Cl.
*H01R 13/646* (2011.01)
*H01R 13/05* (2006.01)
(Continued)

(52) U.S. Cl.
CPC ........... *H01R 13/646* (2013.01); *H01R 13/05* (2013.01); *H01R 13/11* (2013.01); *H01R 13/2407* (2013.01)

(58) Field of Classification Search
CPC ...... H01R 13/646; H01R 13/05; H01R 13/11; H01R 13/2407; H01R 24/86; H01R 13/111; H01R 13/02; H01R 13/40; H01R 24/00
See application file for complete search history.

(56) References Cited

U.S. PATENT DOCUMENTS 4,808,115 A * 2/1989 Norton ................. G02B 6/3897 439/271
4,846,719 A * 7/1989 Iwashita ................ H01R 24/58 439/63
(Continued)

FOREIGN PATENT DOCUMENTS

BR 9101840 A * 12/1991 ........... H01R 12/716
CN 110380297 A * 10/2019
(Continued)

OTHER PUBLICATIONS

Machine Translation KR 20200042980 A, (Apr. 27, 2020) (Year: 2024).*

*Primary Examiner* — Travis S Chambers
(74) *Attorney, Agent, or Firm* — Ming Chieh Chang

(57) ABSTRACT

An electrical connector assembly includes a plug connector and a receptacle connector, the receptacle connector including: a receptacle housing defining a mating surface and plural passageways; and at least two receptacle power terminals and at least one receptacle signal terminal received in corresponding passageways, wherein the receptacle signal terminal is composed of two independent blanking pieces, each blanking piece comprises two elastic arms each having a contacting portion, the two blanking pieces are arranged crosswise and located in a same passageway, and the contacting portions intersect in an X shape along an inserting direction perpendicular to the mating surface, and wherein one of the two blanking pieces has a first extending portion
(Continued)

extending opposite to the elastic arms, the other of the two blanking pieces has two second extending portions spaced with a gap, and the first extending portion goes across the gap and is sandwiched by the two second extending portions.

20 Claims, 10 Drawing Sheets

(51) Int. Cl.
*H01R 13/11* (2006.01)
*H01R 13/24* (2006.01)

(56) References Cited

U.S. PATENT DOCUMENTS

| | | | | | |
|---|---|---|---|---|---|
| 4,975,066 | A | * | 12/1990 | Sucheski | H01R 13/11<br>439/699.1 |
| D337,991 | S | * | 8/1993 | Linton | D13/133 |
| 5,330,372 | A | * | 7/1994 | Pope | H01R 24/66<br>439/682 |

FOREIGN PATENT DOCUMENTS

| | | | | | |
|---|---|---|---|---|---|
| CN | 210224415 | U | * | 3/2020 | |
| CN | 211456029 | U | | 9/2020 | |
| EP | 1511128 | B1 | * | 6/2007 | H01R 24/58 |
| FR | 2845528 | A1 | * | 4/2004 | H01R 13/111 |
| KR | 20200042980 | A | * | 4/2020 | |

* cited by examiner

ELECTRICAL CONNECTOR ASSEMBLY WITH IMPROVED TERMINALS

BACKGROUND OF THE INVENTION

Field of the Invention

The present invention relates generally to an electrical connector assembly to transmit power and signal.

Description of Related Arts

China Utility Model No. 211456029 discloses an electrical connector including an insulative housing and power terminals retained in the insulative housing. The housing includes a mating portion and a sleeve portion surrounding the mating portion with a ring gap. The mating portion defines a plurality of terminal passages receiving the power terminals. However, a retention force between the power terminals of the electrical connector and corresponding terminals of a mating connector is to be improved and adapted for a vibration environment.

An improved electrical connector assembly is desired.

SUMMARY OF THE INVENTION

An object of the present invention is to provide an electrical connector assembly with an improved terminal mating stability.

To achieve the above-mentioned object, an electrical connector assembly comprises a plug connector and a receptacle connector for mating with the plug connector, the receptacle connector comprising: a receptacle housing defining a mating surface and a plurality of passageways through the mating surface; at least two receptacle power terminals received in corresponding passageways; and at least one receptacle signal terminal received in corresponding passageways, wherein the receptacle signal terminal is composed of two independent blanking pieces, each blanking piece comprises two elastic arms each having a contacting portion, the two blanking pieces are arranged crosswise and located in a same passageway, and the contacting portions intersect in an X shape along an inserting direction perpendicular to the mating surface.

DETAILED DESCRIPTION OF THE PREFERRED EMBODIMENT

Referring to FIGS. 1-10, an electrical connector assembly 1000 of an embodiment of this present invention includes a plug connector 100 and a receptacle connector 200 adapted to be mated with each other. The connector assembly transmits power and signal.

Figure 1:
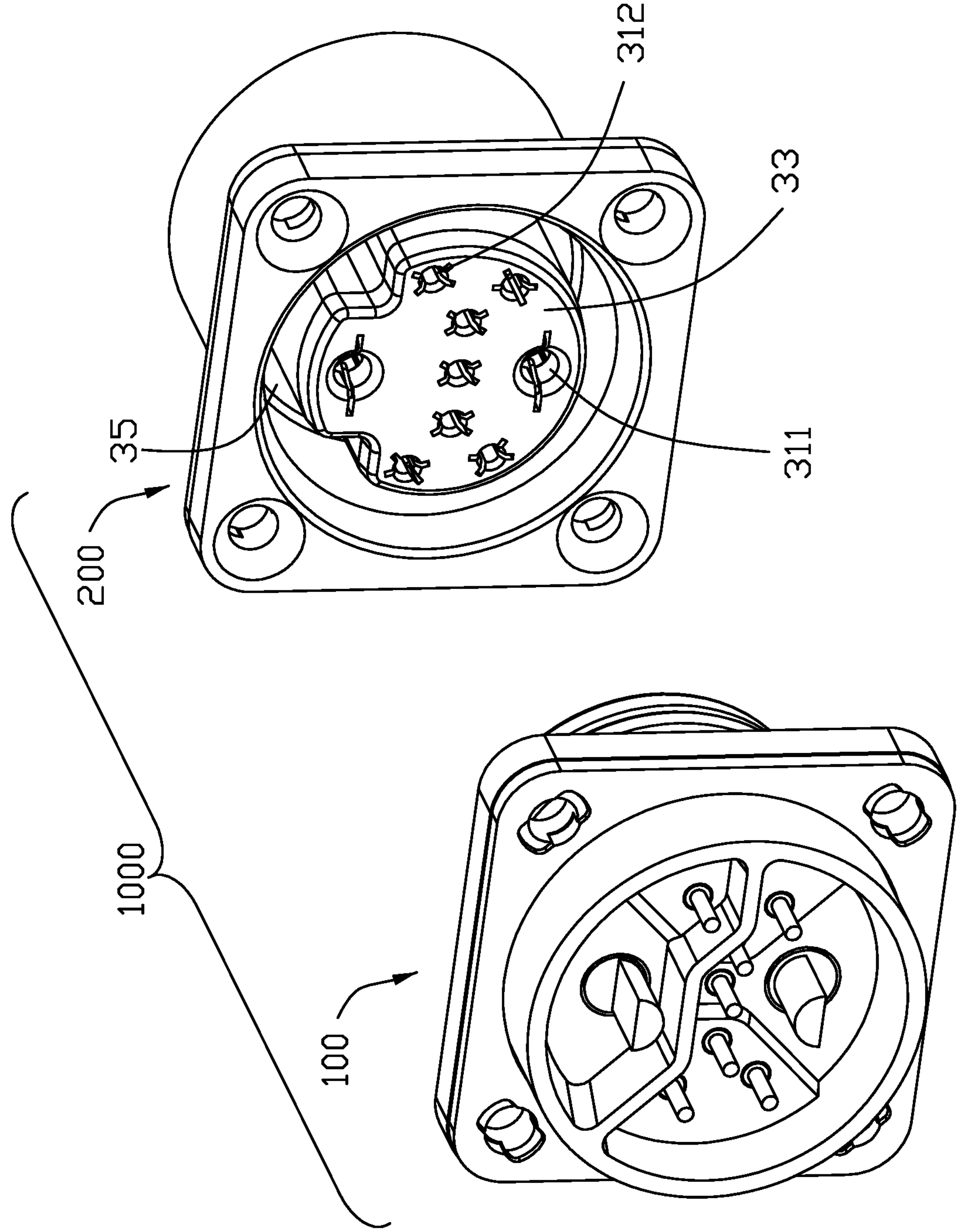
FIG. 1 is a perspective view of an electrical connector assembly according to an embodiment of the present invention, including a plug connector and a receptacle connector.
Figure 2:
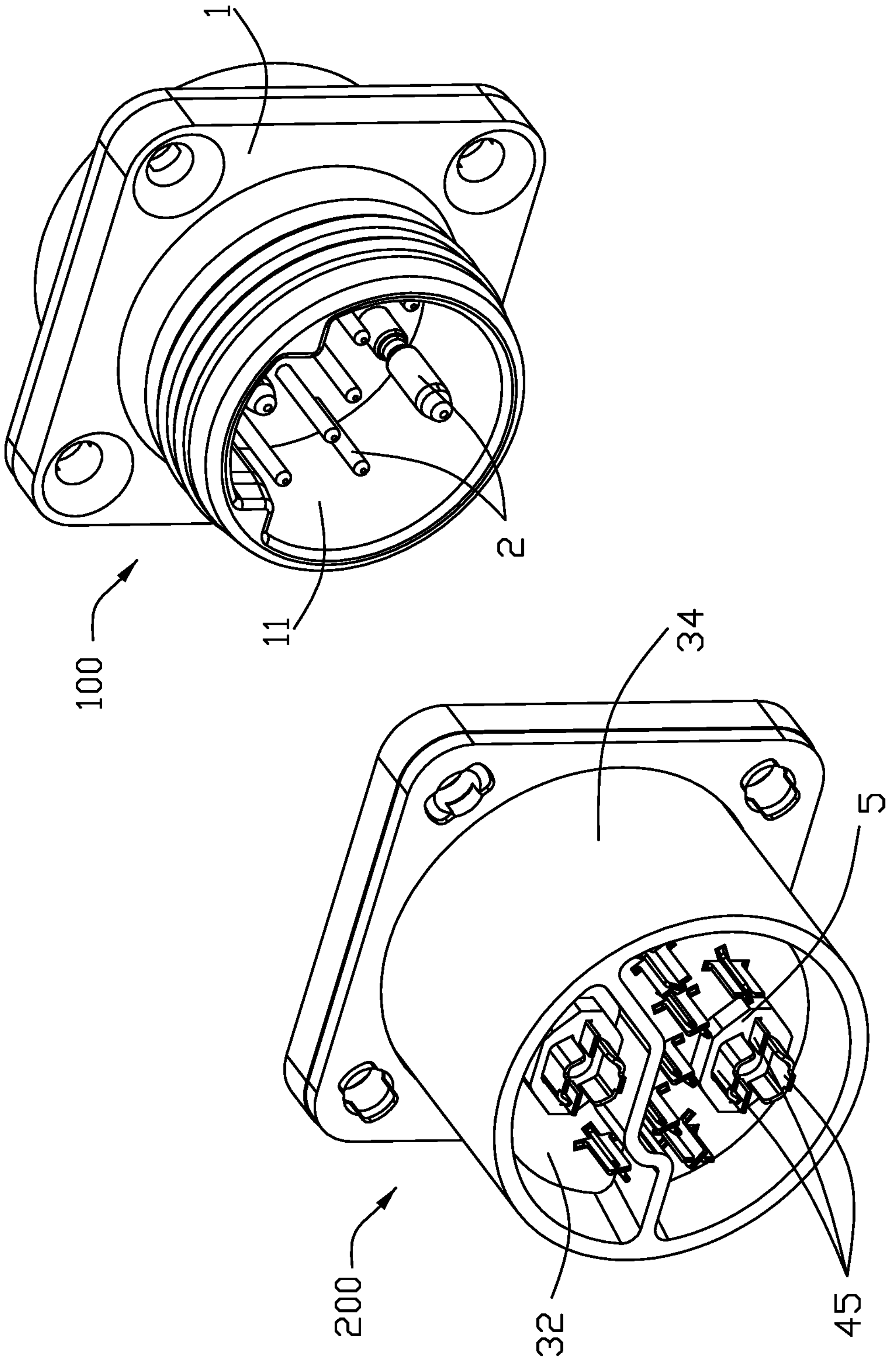
FIG. 2 is another perspective view of the electrical connector assembly in FIG. 1.
Figure 3:
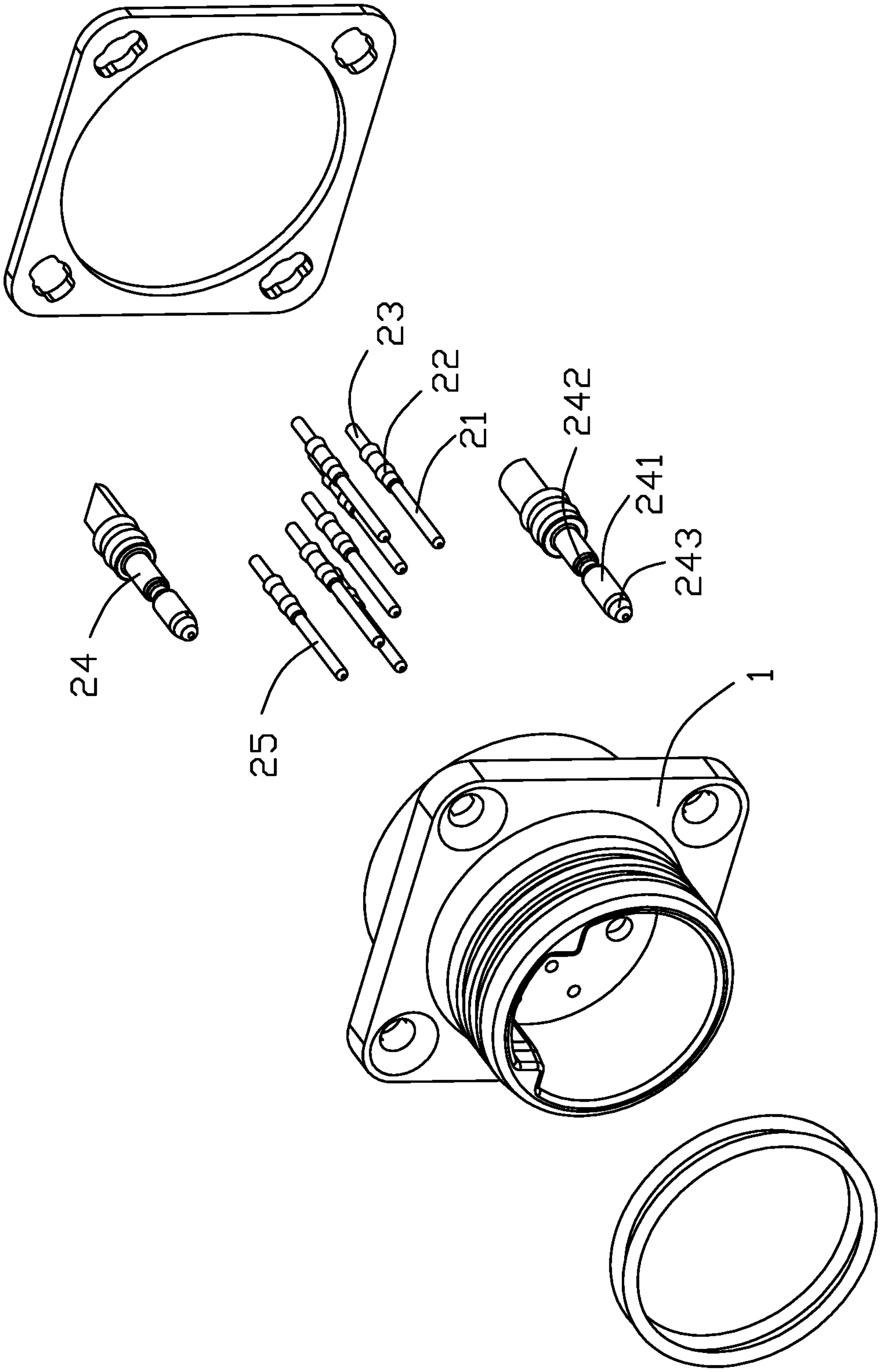
FIG. 3 is an exploded view of the plug connector in FIG. 2.
Figure 4:
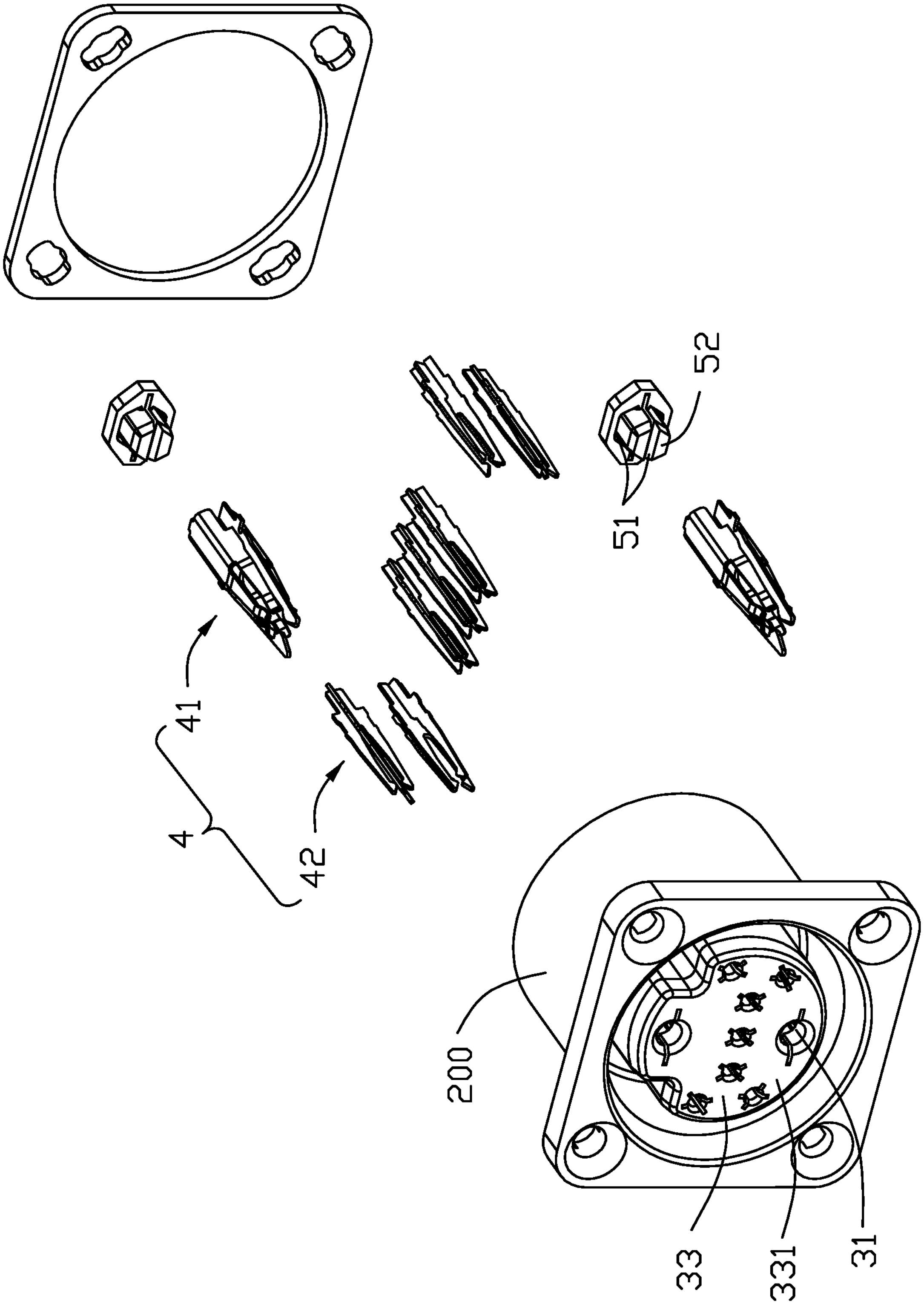
FIG. 4 is an exploded view of the receptacle connector in FIG. 1.

Referring to FIGS. 2-4, the plug connector 100 includes an insulative plug housing 1 and a plurality of conductive plug terminals 2 retained in the plug housing 1. The plug housing 1 includes a mating cavity 11 opening forwards. The plug terminal 2 includes a columnar contacting portion 21 exposed upon the mating cavity 11. The plug terminal 2 includes at least two plug power terminals 24 and at least one plug signal terminal 25.

Figure 7:
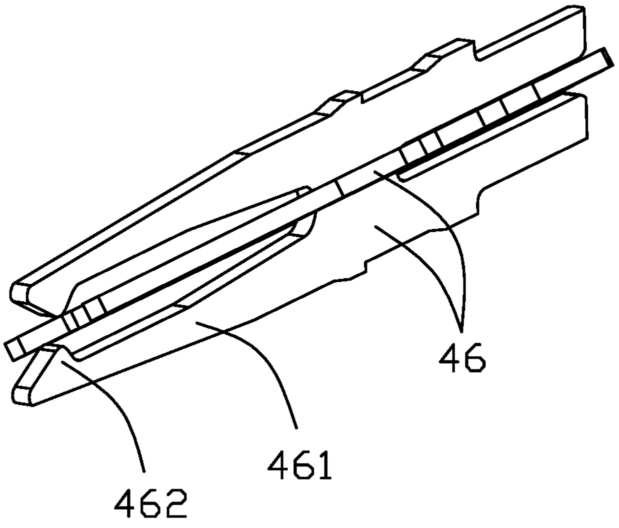
FIG. 7 is a perspective view of the receptacle signal terminal of the receptacle connector in FIG. 4.
Figure 8:
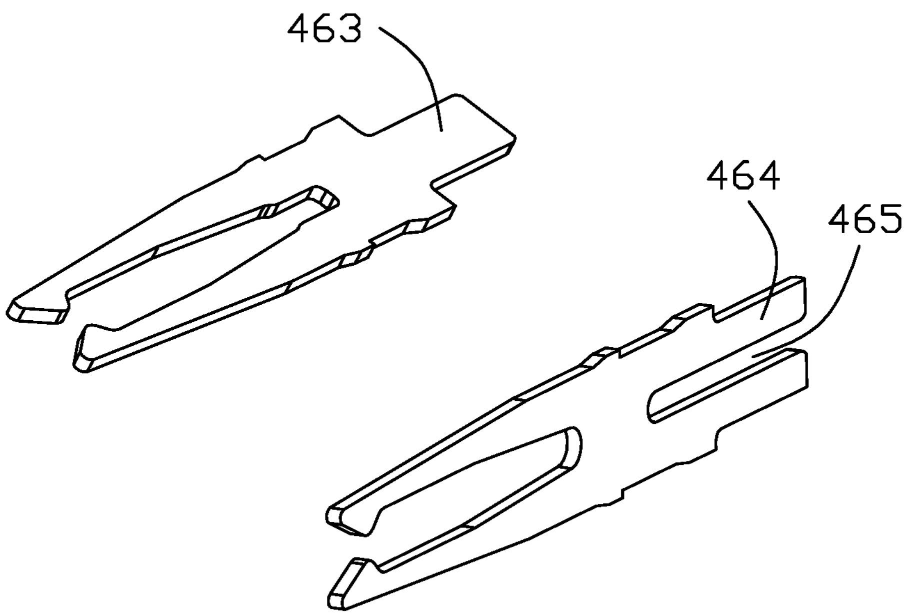
FIG. 8 is an exploded view of the receptacle signal terminal in FIG. 7.
Figure 9:
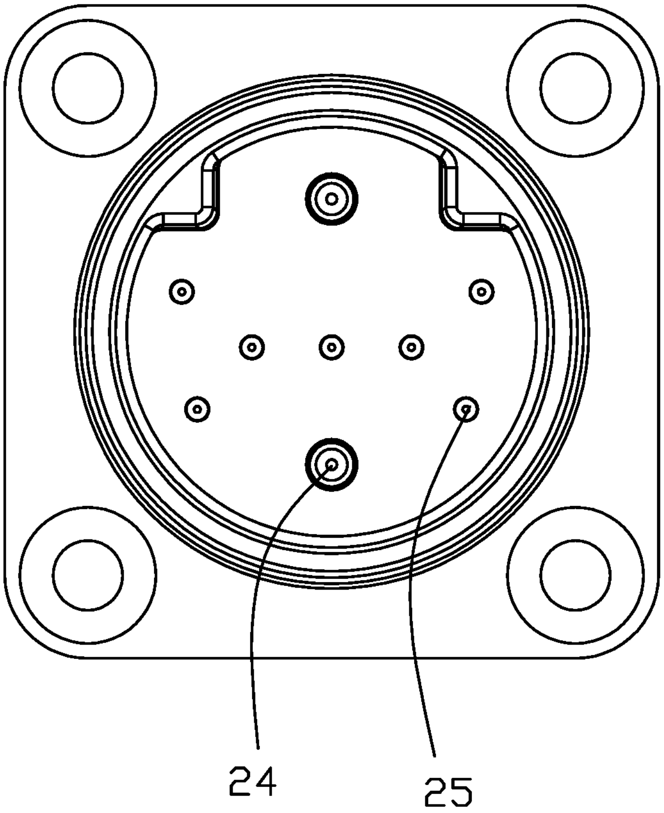
FIG. 9 is a front view of the plug connector in FIG. 1.
Figure 10:
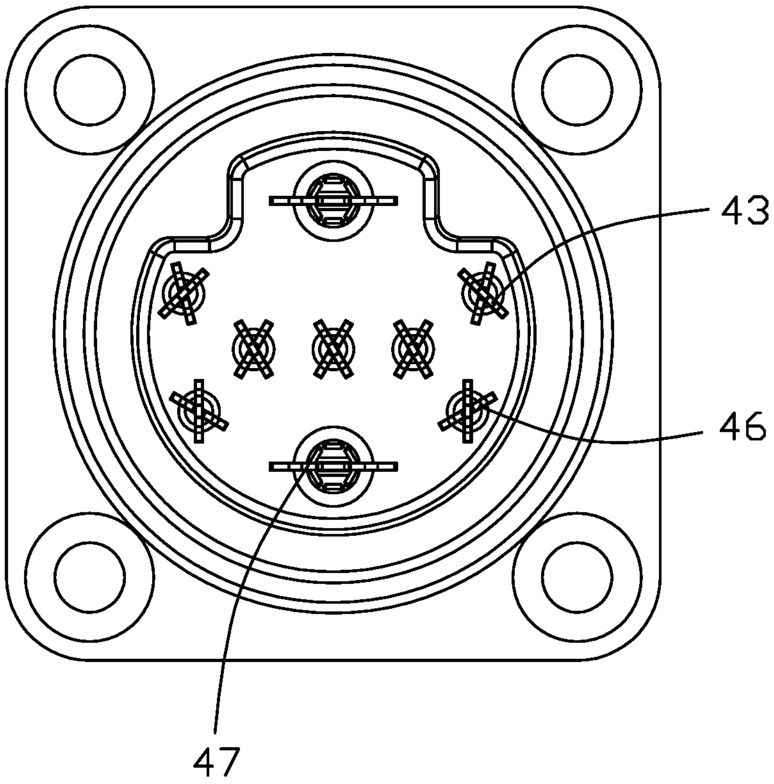
FIG. 10 is a front view of the receptacle connector in FIG. 1.

The receptacle connector 200 includes an insulative receptacle housing 3 and a plurality of conductive receptacle terminals 4 retained in the receptacle housing 3. The receptacle housing 3 defines a mating surface 331 and a plurality of passageways 31 going through the mating surface 331. The passageways 31 receive the receptacle terminals 4 one by one. The receptacle terminal 4 includes at least two receptacle power terminals 41 and at least one receptacle signal terminal 42. Referring to FIGS. 7-8, the receptacle signal terminal 42 is composed of two independent terminal pieces 46, each terminal piece 46 includes two elastic arms 461, and each elastic arm 461 defines a contacting portion 462 at a front end thereof. The terminal pieces 46 are made by blanking process, that is, blanking pieces. The two terminal pieces 46 are arranged crosswise and commonly retained in the corresponding passageway 31. In an inserted direction of the receptacle connector perpendicular to the mating surface 331, the contacting portions 462 of the two signal pieces 46 intersect in an X shape.

Referring to FIG. 3, the plug terminal 2 includes a retaining portion 22 fixed to the plug housing 1 and a soldering tail 23 extending rearwards from the retaining portion, the contacting portion 21 extends forward from the retaining portion 22. In this embodiment, the plug terminals 2 include two plug power terminals 24 and seven plug signal terminals 25. The plug power terminals and the plug signal terminals have a similar construct but differ in diameter. A diameter of the contacting portion of the plug power terminal 24 is larger than the diameter of the contacting portion of the plug signal terminal 25. The contacting portion of the plug power terminal 24 includes a first contacting area 241 and a second contacting area 242 behind the first contact area 241. The diameter of the second contact area 242 is smaller than that of the first contact area 241 to form a concave ring behind the first contact area 241. A guiding portion 243 of which the diameter gradually decreases, extends forwards from the first contacting area 241. The length of the guiding portion 243 is 1.8 mm. The soldering tail of the plug signal terminal 25 is cylindrical, and the soldering tail of the plug power terminal 24 is semi-cylindrical. The plug signal terminals 25 are arranged symmetrically with an imaginary line while the two power terminals 24 are located along the imaginary line.

Figure 5:
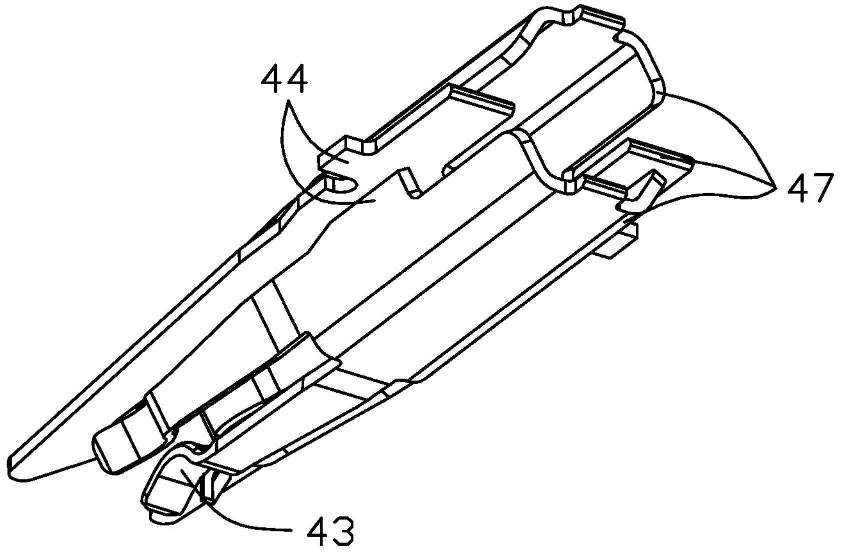
FIG. 5 is a perspective view of a receptacle power terminal of the receptacle connector in FIG. 4.

Referring to FIGS. 4-5, the receptacle housing 3 defines the mating surface 331 and the passageways 31 going through the mating surface 331. The receptacle terminals 4 includes contacting portions 43 retained in the corresponding passageways 31, soldering tails 45 and connection portions 44 connected with the contacting portions 43 and the soldering tails 45. In the inserted direction, the contacting portion 43 of the receptacle signal terminal 42 in the passageway 31 is of an X-shape. The receptacle housing 3 further includes a bottom wall 32, a mating portion 33 extending from the bottom wall 32, and a sleeve wall 34 surrounding the mating portion 33. The front end surface of the mating portion 33 is defined as the mating surface 331. The sleeve wall 34 and the mating portion 33 are spaced apart from each other with a ring cavity 35, and the mating portion 33 defines the passageways 31 to receive the receptacle terminals 4. The passageways 31 includes power passageways 311 to receive the receptacle power terminal 41 and signal passageways 312 to receive the receptacle signal terminals 42.

Referring to FIGS. 7-8, each receptacle signal terminal 42 is composed of two independent terminal pieces 46. Each terminal pieces 46 comprises two elastic arms 461, each elastic arm 461 has a contacting portion 462 at distal free end thereof, and the two terminal pieces 46 are intersected and received in a same passageway 312. The two elastic arms 461 of each terminal piece 46 are located on the same plane and opposite to each other. One of the two terminal pieces 46 has a first extending portion 463 extending backwards, and the other one has two second extending portions 464 extending backwards and spaced from each other with a narrow gap 465. When the two terminal pieces 46 intersect, the first extending portion 463 goes cross the gap 465 and is sandwiched with the two second extending portions 464.

Figure 6:
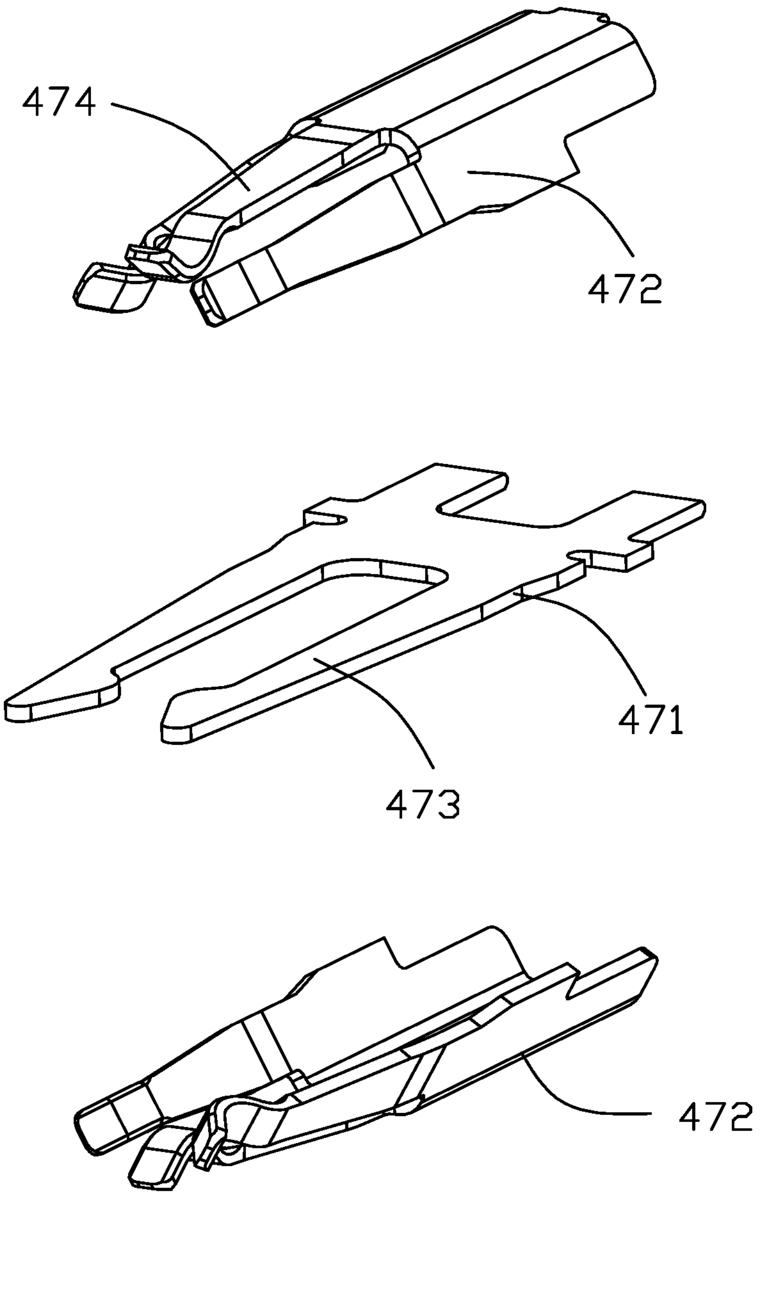
FIG. 6 is an exploded view of the receptacle power terminal in FIG. 5.

Referring to FIGS. 5-6, the receptacle power terminal 41 is composed of three independent terminal pieces 47, one first pieces 471 made by a blanking process and two second piece 472 made by a forming process, the second pieces are located at opposite sides of the first piece 471. The first piece 471 or blanking piece includes two elastic arms 473 with protruding contact portions, and the second piece 472 or forming pieces includes three elastic arms 474 with protruding contacting portions. The elastic arms 473, 474 are arranged in a ring and located in a same passageway 31. The second pieces 472 are symmetrical about the first piece 471. As shown in FIGS. 2 and 4, the receptacle connector 200 includes a fixed cover 5 retained in the power passageway 311 from back to front. The fixed cover 5 defines a slot 51 and a tuber 52 extending forwards from a middle of the fixed cover 5. The soldering tails of first and second pieces 471, 472 pass through the slot 51. The fixed cover 5 covers a rear end of the power passageway 311 to prevent an extravasated glue into the power passageway 311.

The two elastic arms 473 extends horizontally along a front-to-back direction and are oppositely arranged. The elastic arms 474 extend obliquely inwards. The contacting portions 43 of the first piece 471 are located in front of the contact portions 43 of the second pieces 472. The contacting portion 43 of the first piece 471 is in contact with the second contacting area 242 of the plug connector. The contacting portions 43 of the second pieces are in contact with the first contacting area 241.

The above-mentioned embodiments are only preferred embodiments of the present invention, and should not limit the scope of the present invention, any simple equivalent changes and modifications made according to the claims of the present invention and the contents of the description should still belong to the present invention.

The invention claimed is:

1. An electrical connector assembly comprising:
a plug connector; and
a receptacle connector for mating with the plug connector, the receptacle connector comprising:
a receptacle housing defining a mating surface and a plurality of passageways through the mating surface; and
at least two receptacle power terminals and at least one receptacle signal terminal received in corresponding passageways;
wherein the receptacle signal terminal is composed of two independent blanking pieces, each blanking piece comprises two elastic arms each having a contacting portion, the two blanking pieces are arranged crosswise and located in a same passageway, and the contacting portions intersect in an X shape along an inserting direction perpendicular to the mating surface; and
wherein one of the two blanking pieces comprises a first extending portion extending opposite to the elastic arms, the other of the two blanking pieces comprises two second extending portions spaced with a gap, and the first extending portion goes across the gap and is sandwiched by the two second extending portions.

2. The electrical connector assembly as claimed in claim 1, wherein the receptacle connector comprises three receptacle signal terminals arranged in a row and two receptacle signal terminals at two opposite ends of the row.

3. The electrical connector assembly as claimed in claim 1, wherein the receptacle housing comprises a bottom wall, a mating portion extending from the bottom wall, and a sleeve wall surrounding and spaced from the mating portion with a ring cavity, and the passageways are disposed on the mating portion.

4. The electrical connector assembly as claimed in claim 1, wherein the receptacle power terminal is composed of a blanking piece and two forming pieces at opposite side of the blanking piece, and the blanking piece and the forming pieces are independent from each other and are ringed and received in a same passageway.

5. The electrical connector assembly as claimed in claim 4, wherein the blanking piece of the receptacle power terminal comprises two elastic arms with contacting portions, each of the two forming pieces comprises three elastic arms with contacting portions, and the elastic arms of the receptacle power terminal are ring shaped.

6. The electrical connector assembly as claimed in claim 5, wherein the contacting portions of the blanking pieces of the receptacle power terminals are located nearer to the mating surface than the contacting portions of the forming pieces.

7. The electrical connector assembly as claimed in claim 1, wherein the plug connector comprises:
a plug housing; and
a plurality of plug terminals retained in the plug housing and comprising plug power terminals and plug signal terminals;
wherein each of the plug terminals comprises a contacting portion of a columnar shape.

8. The electrical connector assembly as claimed in claim 7, wherein the contacting portion of the plug power terminal defines a first contact area and a second contact area behind the first contact area, and the second contact area is smaller than the first contact area in diameter so as to form a concave ring.

9. A receptacle connector comprising:
a receptacle housing defining a mating surface and a plurality of passageways through the mating surface;
a receptacle power terminal retained in a corresponding passageway; and a receptacle signal terminal retained in a corresponding passageway;

wherein the receptacle signal terminal comprises four elastic arms each having a contacting portion, and the four contacting portions are arranged in an X shape in an inserting direction of the receptacle connector perpendicular to the mating surface; and wherein the receptacle power terminal is composed of one first piece and two second pieces located at opposite sides of the first piece, the first piece comprises two elastic arms, each of the two second pieces comprises three elastic arms, and the elastic arms of the first and the second pieces are ring shaped and received in a same terminal passageway.

10. The receptacle connector as claimed in claim 9, wherein the first piece is of a blanking piece, and the second pieces are of a forming piece.

11. The receptacle connector as claimed in claim 9, wherein the receptacle signal terminal is composed of two independent terminal pieces, each terminal piece comprises two elastic arms, and the two terminal pieces are arranged crosswise and received at a same passageway.

12. The receptacle connector as claimed in claim 11, wherein one of the two terminal pieces comprises a first extending portion extending opposite to the elastic arms, the other terminal piece has two second extending portions extending opposite to the elastic arms and spaced from each other with a gap, and the first extending portion is held by the gap.

13. The receptacle connector as claimed in claim 11, wherein the contacting portions of one of the two terminal pieces are located behind the contacting points of the other terminal piece thereof.

14. The receptacle connector as claimed in claim 11, wherein the two terminal pieces are of a blanking piece.

15. The receptacle connector as claimed in claim 11, wherein the two elastic arms of each terminal piece are located on a same plane and opposite to each other.

16. An electrical connector assembly comprising:

a plug connector; and a receptacle connector for mating with the plug connector, the receptacle connector comprising:

a receptacle housing defining a mating surface and a plurality of passageways through the mating surface; and at least two receptacle power terminals and at least one receptacle signal terminal received in corresponding passageways;

wherein the receptacle signal terminal is composed of two independent blanking pieces, each blanking piece comprises two elastic arms each having a contacting portion, the two blanking pieces are arranged crosswise and located in a same passageway, and the contacting portions intersect in an X shape along an inserting direction perpendicular to the mating surface; and wherein the receptacle power terminal is composed of a blanking piece and two forming pieces at opposite side of the blanking piece, and the blanking piece and the forming pieces are independent from each other and are ringed and received in a same passageway.

17. The electrical connector assembly as claimed in claim 16, wherein the blanking piece of the receptacle power terminal comprises two elastic arms with contacting portions, each of the two forming pieces comprises three elastic arms with contacting portions, and the elastic arms of the receptacle power terminal are ring shaped.

18. The electrical connector assembly as claimed in claim 17, wherein the contacting portions of the blanking pieces of the receptacle power terminals are located nearer to the mating surface than the contacting portions of the forming pieces.

19. The electrical connector assembly as claimed in claim 16, wherein the plug connector comprises:

a plug housing; and a plurality of plug terminals retained in the plug housing and comprising plug power terminals and plug signal terminals;

wherein each of the plug terminals comprises a contacting portion of a columnar shape.

20. The electrical connector assembly as claimed in claim 19, wherein the contacting portion of the plug power terminal defines a first contact area and a second contact area behind the first contact area, and the second contact area is smaller than the first contact area in diameter so as to form a concave ring.

* * * * *